United States Patent
Wang

(10) Patent No.: US 9,167,400 B2
(45) Date of Patent: Oct. 20, 2015

(54) METHOD OF USING BASE STATION SIGNAL TO QUICKLY SET CALL FORWARDING AND MOBILE COMMUNICATION TERMINAL

(75) Inventor: Huiyao Wang, Huizhou (CN)

(73) Assignee: HUIZHOU TCL MOBILE COMMUNICATIONS CO., LTD., Huizhou, Guangdong Province (CN)

( * ) Notice: Subject to any disclaimer, the term of this patent is extended or adjusted under 35 U.S.C. 154(b) by 248 days.

(21) Appl. No.: 13/811,267

(22) PCT Filed: Mar. 29, 2011

(86) PCT No.: PCT/CN2011/072233
§ 371 (c)(1),
(2), (4) Date: Jan. 19, 2013

(87) PCT Pub. No.: WO2012/013047
PCT Pub. Date: Feb. 2, 2012

(65) Prior Publication Data
US 2013/0122881 A1    May 16, 2013

(30) Foreign Application Priority Data

Jul. 30, 2010    (CN) .......................... 2010 1 0242958

(51) Int. Cl.
*H04W 4/16*    (2009.01)
*H04M 3/00*    (2006.01)

(52) U.S. Cl.
CPC . *H04W 4/16* (2013.01); *H04M 3/00* (2013.01)

(58) Field of Classification Search
CPC ....... H04W 4/02; H04W 64/00; H04W 24/10; H04W 64/006; H04W 36/14; H04W 8/005; H04W 36/0083; H04W 48/16; H04W 24/00; H04W 36/0088; H04W 4/021; H04W 4/22; H04W 12/12; H04W 48/04; H04W 84/045
See application file for complete search history.

(56) References Cited

U.S. PATENT DOCUMENTS

| | | | | |
|---|---|---|---|---|
| 5,548,816 A | * | 8/1996 | DeVaney | 455/456.2 |
| 5,594,782 A | * | 1/1997 | Zicker et al. | 455/417 |
| 5,649,286 A | * | 7/1997 | Frerking | 455/435.1 |
| 5,673,308 A | * | 9/1997 | Akhavan | 455/461 |
| 5,675,629 A | * | 10/1997 | Raffel et al. | 455/552.1 |
| 5,745,850 A | * | 4/1998 | Aldermeshian et al. | 455/417 |
| 6,195,545 B1 | * | 2/2001 | Baker et al. | 455/414.1 |
| 6,233,448 B1 | * | 5/2001 | Alperovich et al. | 455/417 |

(Continued)

FOREIGN PATENT DOCUMENTS

| | | | | |
|---|---|---|---|---|
| CN | 101087335 | | * 12/2007 | |
| CN | 101087335 A | | * 12/2007 | ............. H04M 3/54 |

(Continued)

*Primary Examiner* — Mehmood B Khan
(74) *Attorney, Agent, or Firm* — Cheng-Ju Chiang

(57) ABSTRACT

The present disclosure generally relates to the technical field of communications, and discloses a method of using a base station signal to quickly set call forwarding and a mobile communication terminal. The method comprises the following steps of: A. carrying out setting of call forwarding, and saving a base station information of a wireless network where the call forwarding is set; and B. reading a call forwarding target phone number that is set, sending a call forwarding request to the wireless network, and after a confirmation is obtained from the wireless network, activating a check timer to complete the setting of call forwarding.

8 Claims, 2 Drawing Sheets

(56) References Cited

U.S. PATENT DOCUMENTS

| | | | |
|---|---|---|---|
| 6,359,896 B1* | 3/2002 | Baker et al. | 370/410 |
| 6,810,259 B1* | 10/2004 | Zhang | 455/456.5 |
| 2001/0014614 A1* | 8/2001 | Lautenschlager et al. | 455/553 |
| 2002/0119788 A1* | 8/2002 | Parupudi et al. | 455/456 |
| 2003/0224795 A1* | 12/2003 | Wilhoite et al. | 455/445 |
| 2006/0052113 A1* | 3/2006 | Ophir et al. | 455/456.1 |
| 2006/0116127 A1* | 6/2006 | Wilhoite et al. | 455/442 |
| 2008/0051106 A1* | 2/2008 | Zicker et al. | 455/456.2 |
| 2009/0290571 A1* | 11/2009 | Margolis | 370/350 |

FOREIGN PATENT DOCUMENTS

| | | | | |
|---|---|---|---|---|
| CN | 101087466 A | | 12/2007 | |
| CN | 101115306 A | | 1/2008 | |
| CN | 101534472 | * | 9/2009 | H04W 4/02 |
| CN | 101534472 A | * | 9/2009 | H04W 4/02 |

\* cited by examiner

METHOD OF USING BASE STATION SIGNAL TO QUICKLY SET CALL FORWARDING AND MOBILE COMMUNICATION TERMINAL

CROSS REFERENCE TO RELATED APPLICATIONS

The present application is a 35 U.S.C. §371 National Phase conversion of International (PCT) Patent Application No. PCT/CN2011/072233, filed on Mar. 29, 2011, the disclosure of which is incorporated by reference herein. The PCT International Patent Application was published in Chinese.

FIELD OF THE INVENTION

The present disclosure generally relates to the technical field of communications, and more particularly, to a method of using a base station signal to quickly set call forwarding and a mobile communication terminal.

BACKGROUND OF THE INVENTION

Nowadays, use of mobile phones has become more and more widespread, and almost every person has a mobile phone. On the other hand, hand-free telephones have also become widely used, so it is often the case that both a hand-free telephone and a mobile phone are available for communication in some places. To meet many people's demands, a call forwarding function is defined in mobile phones. However, a user who has enabled the call forwarding function might forget to cancel the call forwarding function later for some reasons, and this will cause a loss to the user due to missing of the call.

Accordingly, there is still room for improvement and development of the prior art.

SUMMARY OF THE INVENTION

In view of the aforesaid shortcoming of the prior art, an objective of the present disclosure is to provide a method of using a base station signal to quickly set call forwarding and a mobile communication terminal, which are convenient to operate and flexible in use and, therefore, is convenient for the user.

A technical solution of the present disclosure to achieve the aforesaid objective is as below:

a method of using a base station signal to quickly set call forwarding comprises the following steps of:

A. carrying out setting of call forwarding, and saving a base station information of a wireless network where the call forwarding is set; and B. reading a call forwarding target phone number that is set, sending a call forwarding request to the wireless network, and after a confirmation is obtained from the wireless network, activating a check timer to complete the setting of call forwarding.

Preferably, the method of using a base station signal to quickly set call forwarding further comprises the following steps of:

C. activating the check timer according to a timing, checking a location of the call forwarding, and reading a base station information of a current wireless network;

D. comparing the base station information of the current wireless network with the base station information of the wireless network where the call forwarding is set to determine a change in location; and E. if a change in location is determined, then canceling the setting of call forwarding automatically.

Preferably, the step A further comprises: saving the base station information of the wireless network where the call forwarding is set into a non-volatile random access memory (NVRAM).

Preferably, the base station information comprises an active cell identification (Active_CELL_ID), an active cell signal strength (Active_RXLev) and a neighbor cell identification (Neighbor_CELL_ID).

Preferably, the step D comprises the following steps of:

D1. comparing the active cell identification and the neighbor cell identification in the base station information of the current wireless network with the active cell identification and the neighbor cell identification in the base station information of the wireless network where the call forwarding is set respectively;

D2. if at least one pair of the identifications is found to be identical to each other, then it means that the location has not changed and is still located in an original call forwarding area; and D3. if neither pair of the identifications is found to be identical to each other, then it means that the location has changed and moved away from the original call forwarding area.

Preferably, the number of the neighbor cells is 5.

Preferably, the check timer is a software function.

The present disclosure further provides a mobile communication terminal, which comprises:

a call forwarding setting and saving module, being configured to carry out setting of call forwarding, and save a base station information of a wireless network where the call forwarding is set; and a call forwarding confirming module, being configured to read a call forwarding target phone number that is set, send a call forwarding request to the wireless network, and after a confirmation is obtained from the wireless network, complete the setting of call forwarding.

Preferably, the mobile communication terminal further comprises:

a check timer module, being configured to detect current location information of the mobile communication terminal;

a location comparing module, being configured to compare the base station information of the current wireless network with the base station information of the wireless network where the call forwarding is set to determine a change in location of the mobile communication terminal; and a call forwarding canceling module, being configured to cancel the setting of call forwarding automatically if a change in location of the mobile communication terminal is determined.

As compared to the prior art, the method of using a base station signal to quickly set call forwarding and the mobile communication terminal according to the present disclosure have the following benefits:

1. simple to use: the setting of call forwarding can be completed by the user through one special key; and 2. flexible to use (customizability): by means of the function of the mobile communication terminal that it can automatically detect the base station signal and by storing and comparing changes of the base station signal, the present disclosure can determine a change in location of a mobile phone so as to automatically cancel the setting of call forwarding in time when the mobile phone of the user has been away from the location where the call forwarding is set; and the mobile communication terminal can switch between a mobile network and a hand-free telephone network seamlessly.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

Hereinbelow, the present disclosure will be further described with reference to the attached drawings and embodiments thereof.

The present disclosure provides a method of using a base station signal to quickly set call forwarding and a mobile communication terminal. To make the objectives, technical solutions and advantages of the present disclosure clearer, the present disclosure will be further detailed hereinbelow with reference to the attached drawings and embodiments thereof. It shall be appreciated that, the embodiments described herein are only intended to illustrate but not to limit the present disclosure.

Figure 1:
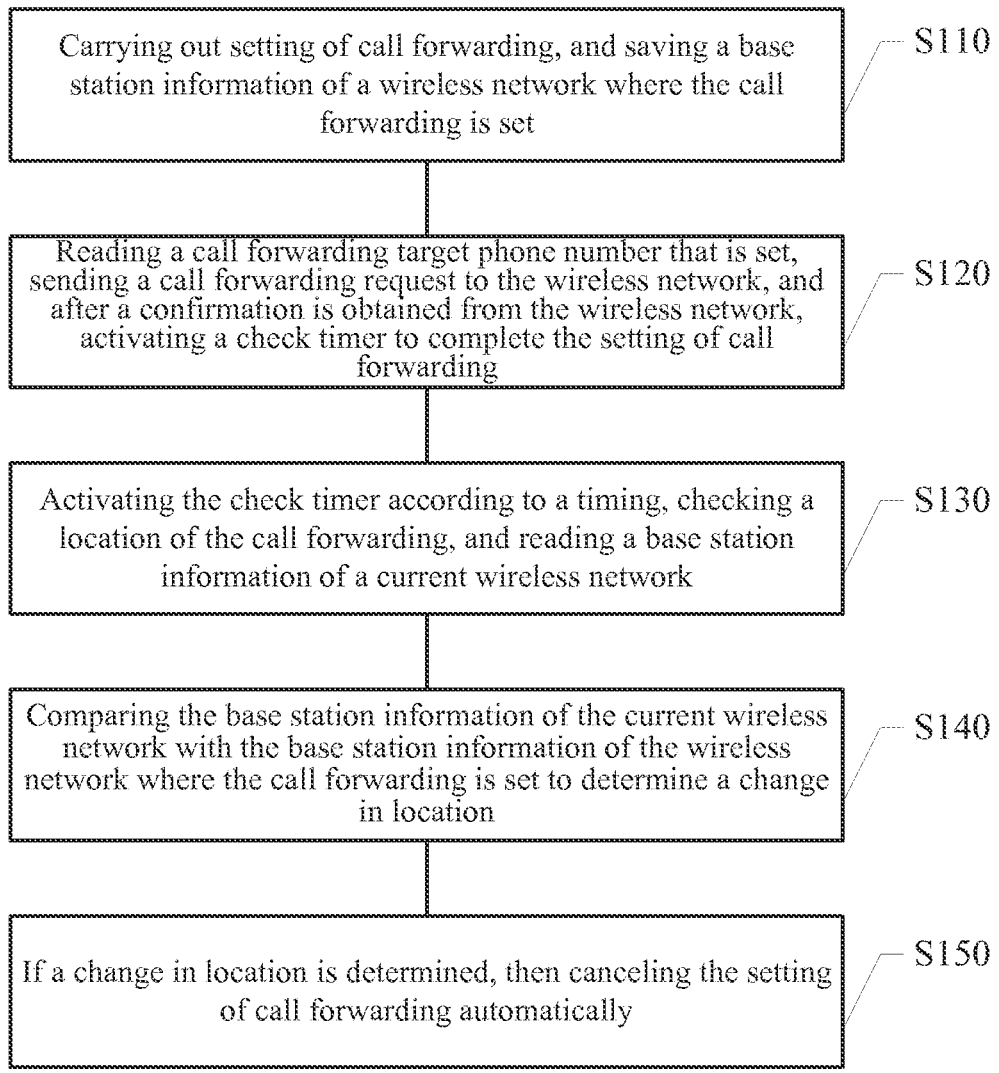
FIG. 1 is a flowchart diagram of a method of using a base station signal to quickly set call forwarding according to an embodiment of the present disclosure.

As shown in FIG. 1, taking the case where call forwarding is set in a mobile phone as an example, a method of using a base station signal to quickly set call forwarding according to an embodiment of the present disclosure comprises the following steps of:

S110. carrying out setting of call forwarding in the mobile phone, and saving a base station information of a wireless network where the call forwarding is set, wherein the base station information comprises an active cell identification, an active cell signal strength, identifications of five neighbor cells and so on, and the base station information of the wireless network where the call forwarding is set is saved into a non-volatile random access memory (NVRAM);

S120. reading a call forwarding target phone number that is set, sending a call forwarding request to the wireless network, and after a confirmation is obtained from the wireless network, activating a check timer to complete the setting of call forwarding;

S130. activating the check timer according to a timing, checking a location of the call forwarding, and reading a base station information of a current wireless network;

S140. comparing the base station information of the current wireless network with the base station information of the wireless network where the call forwarding is set to determine a change in location; and The step S140 comprises the following steps of:

S141. comparing an active cell identification and identifications of five neighbor cells in the base station information of the current wireless network with the active cell identification and the identifications of the five neighbor cells in the base station information of the wireless network where the call forwarding is set respectively;

S142. if at least one pair of the identifications is found to be identical to each other, then it means that the location has not changed and is still located in an original call forwarding area; and S143. if no pair of the identifications is found to be identical to each other, then it means that the location has changed and moved away from the original call forwarding area; and S150. if a change in location is determined, then canceling the setting of call forwarding automatically.

Figure 2:
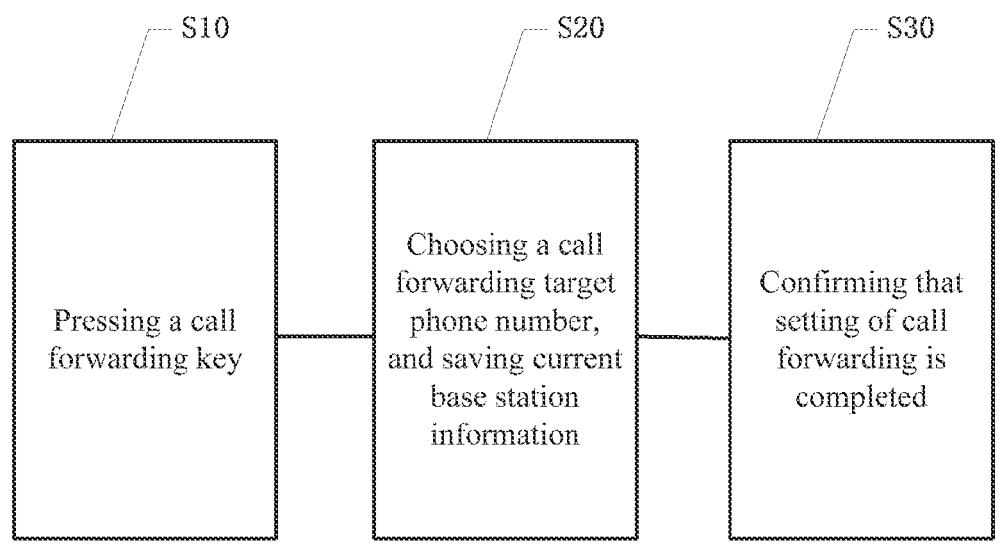
FIG. 2 is a basic framework diagram of an application embodiment of the present disclosure.

Hereinbelow, the present disclosure will be further detailed with reference to an application embodiment. In this embodiment, a mobile phone is taken as an example. The basic framework of this embodiment is as shown in FIG. 2: S10. pressing a call forwarding key; S20. choosing a call forwarding target phone number, and saving current base station information (CELL_ID, RXLev); and S30. completing setting of call forwarding.

When the user chooses call forwarding, a specific call forwarding key can be pressed directly to set the call forwarding. The specific call forwarding key may be a key that is separately set for this function in the hardware, or a functional shortcut key that can be set.

Symbols to be used in this application embodiment are respectively explained as follows. Active_CELL_ID represents the active cell identification; A_ID0 represents the corresponding value of Active_CELL_ID; Neighbor CELL_ID0, Neighbor_CELL_ID1, Neighbor_CELL_ID2, Neighbor_CELL_ID3 and Neighbor_CELL_ID4 represent the identifications of five neighbor cells; and N_ID0, N_ID1, N_ID2, N_ID3 and N_ID4 represent the corresponding values of Neighbor_CELL_ID0, Neighbor_CELL_ID1, Neighbor_CELL_ID2, Neighbor_CELL_ID3 and Neighbor_CELL_ID4.

Active_RXLev represents the active cell signal strength, and A_RXLev represents the corresponding value of Active_RXLev. Neighbor_RXLev0, Neighbor_RXLev1, Neighbor_RXLev2, Neighbor_RXLev3 and Neighbor_RXLev4 represent the corresponding signal strengths of the five neighbor cells; and N_RXLev0, N_RXLev1, N_RXLev2, N_RXLev3 and N_RXLev4 represent the corresponding values of Neighbor_RXLev0, Neighbor_RXLev1, Neighbor_RXLev2, Neighbor_RXLev3 and Neighbor_RXLev4.

First step: during setting of call forwarding, a base station information of a wireless network where the call forwarding is set is recorded by the mobile phone. The base station information is, for example, the cell identifications (cell IDs) and the corresponding cell signal strengths, which include the active cell identification (A_ID), the active cell signal strength (A_RXLev), and IDs of neighbor cells (i.e., the corresponding value (N_ID0) of the first neighbor cell identification, the corresponding value (N_RXLev0) of the first neighbor cell signal strength, the corresponding value (N_ID1) of the second neighbor cell identification, the corresponding value (N_RXLev1) of the second neighbor cell signal strength, the corresponding value (N_ID2) of the third neighbor cell identification, the corresponding value (N_RXLev2) of the third neighbor cell signal strength, the corresponding value (N_ID3) of the fourth neighbor cell identification, and the corresponding value (N_RXLev3) of the fourth neighbor cell signal strength).

Second step: the aforesaid values are stored into an NVRAM.

Third step: after the setting is completed, the mobile phone reads a call forwarding target phone number from the NVRAM and sends a call forwarding request to the wireless network; and after a confirmation is obtained from the wireless network, the mobile phone activates a check timer to complete the setting of call forwarding.

Fourth step: the check timer is activated according to a timing, and a call forwarding location check program is started in the mobile phone.

Fifth step: the location check program is executed to read a base station information of a current wireless network of the mobile phone (i.e., an active cell identification (Active_CELL_ID), an active cell signal strength (Active_RXLev) and neighbor cell information). Neighbor_CELL_ID0, Neighbor_CELL_ID1, Neighbor_CELL_ID2, Neighbor_CELL_ID3 and Neighbor_CELL_ID4 represent identifications of five neighbor cells; and Neighbor_RXLev0, Neighbor_RXLev1, Neighbor_RXLev2, Neighbor_RXLev3 and Neighbor_RXLev4 represent corresponding signal strengths of the five neighbor cells.

Sixth step: the base station information of the current wireless network is compared with the active cell identification (A_ID), the active cell signal strength (A_RXLev) and the IDs of the neighbor cells that are stored in the NVRAM during the setting of call forwarding. The corresponding values of the five neighbor cell identifications are N_ID0, N_ID1, N_ID2, N_ID3 and N_ID4 respectively, and the corresponding values of the five neighbor cell signal strengths are N_RXLev0, N_RXLev1, N_RXLev2, N_RXLev3 and N_RXLev4 respectively.

If the current active cell identification (Active_CELL_ID) is one of A_ID, N_ID0, N_ID1 and N_ID2 or the neighbor cell identification (Neighbor_CELL_ID) is one of A_ID, N_ID0, N_ID1 and N_ID2, then it means that the mobile phone is still located in the original call forwarding area. Otherwise, it means that the mobile phone has moved away from the original call forwarding area, and then the call forwarding that is set is canceled automatically.

In the present disclosure, the number of the neighbor cells of the current base station shall be determined according to the current wireless network, and may be 3, 4 or 5, and is usually 5.

The check timer in the present disclosure is a software function. When the timer is set, a corresponding timer program will be activated and executed after a specified time interval has elapsed.

Figure 3:
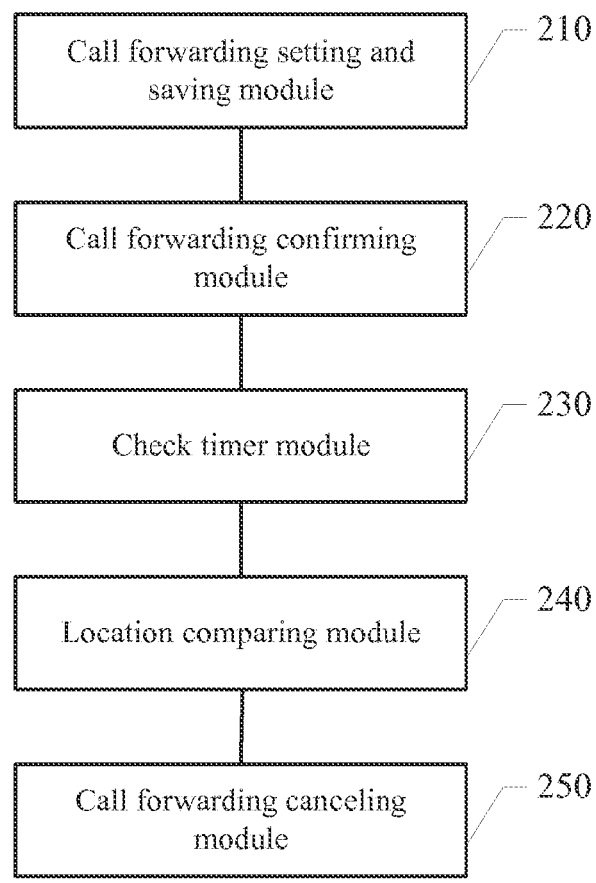
FIG. 3 is a schematic block diagram of a mobile communication terminal according to an embodiment of the present disclosure.

On the basis of the aforesaid method of using a base station signal to quickly set call forwarding, an embodiment of the present disclosure further provides a mobile communication terminal. As shown in FIG. 3, the mobile communication terminal comprises:

a call forwarding setting and saving module 210, being configured to carry out setting of call forwarding, and save a base station information of a wireless network where the call forwarding is set;

a call forwarding confirming module 220, being configured to read a call forwarding target phone number that is set, send a call forwarding request to the wireless network, and after a confirmation is obtained from the wireless network, complete the setting of call forwarding;

a check timer module 230, being configured to detect current location information of the mobile communication terminal;

a location comparing module 240, being configured to compare the base station information of the current wireless network with the base station information of the wireless network where the call forwarding is set to determine a change in location of the mobile communication terminal; and a call forwarding canceling module 250, being configured to cancel the setting of call forwarding automatically if a change in location of the mobile communication terminal is determined.

The method of using a base station signal to quickly set call forwarding and the mobile communication terminal according to the present disclosure have the following benefits:

1. simple to use: the setting of call forwarding can be completed by the user through one special key; and 2. flexible to use (customizability): by means of the function of the mobile communication terminal that it can automatically detect the base station signal and by storing and comparing changes of the base station signal, the present disclosure can determine a change in location of a mobile phone so as to automatically cancel the setting of call forwarding in time when the mobile phone of the user has been away from the location where the call forwarding is set; and the mobile communication terminal can switch between a mobile network and a hand-free telephone network seamlessly.

It shall be appreciated that, the application of the present disclosure is not limited to the aforesaid examples. Those of ordinary skill in the art may make modifications or alterations according to the above descriptions, and all of these modifications and alterations shall be covered within the scope of the appended claims of the present disclosure.

What is claimed is:

1. A method of using a base station signal to quickly set call forwarding for a mobile communication terminal, the method comprising the following steps of:

setting a call forwarding service and a target phone number for the mobile communication terminal and saving a first base station information of a wireless network where the call forwarding service is set, wherein the first base station information comprises a first active cell identification, a first active cell signal strength and a first neighbor cell identification;

reading the target phone number and sending a call forwarding request to the wireless network, and obtaining a confirmation from the wireless network;

running a timer of the mobile communication terminal according to a timing, checking a location of the mobile communication terminal, and reading a second base station information of a current wireless network, wherein the second base station information comprises a second active cell identification, a second active cell signal strength and a second neighbor cell identification;

comparing the second base station information of the current wireless network with the first base station information of the wireless network where the call forwarding service is set to determine a change in location of the mobile communication terminal; and automatically canceling the setting of the call forwarding service when the change in location of the mobile communication terminal is determined.

2. The method of claim 1, wherein the saving the first base station information comprises saving the first base station information of the wireless network where the call forwarding service is set into a non-volatile random access memory.

3. The method of claim 1, wherein the comparing the second base station information of the current wireless network with the first base station information of the wireless network comprises:

comparing the second active cell identification, the second active cell signal strength and the second neighbor cell identification in the second base station information of the current wireless network with the first active cell identification, the first active cell signal strength and the first neighbor cell identification in the first base station of the wireless network where the call forwarding service is set respectively;

when at least one pair of identifications of the second active cell identification, the first active cell identification, the second neighbor cell identification and the first neighbor cell identification are found to be identical, or the second active cell signal strength and the first active cell signal strength is found to be identical, the location of the mobile communication terminal has not changed and is still located in an original call forwarding set area; otherwise, automatically canceling the setting of the call forwarding service.

4. The method of claim 1, wherein the timer is a software function of the mobile communication terminal; when the timer is set, a corresponding timer program is activated and executed in a specified time interval.

5. The method of claim 1, wherein the first base station information comprises the first active cell identification, the first active cell signal strength and first five neighbor cell identifications; and the second base station information comprises the second active cell identification, the second active cell signal strength and second five neighbor cell identifications.

6. The method of claim 5, wherein the comparing the second base station information of the current wireless network with the first base station information of the wireless network comprises:

respectively comparing the second active cell identification and the second five neighbor cell identifications in the second base station information of the current wireless network with the first active cell identification and the first five neighbor cell identifications in the first base station information of the wireless network where the call forwarding service is set;

when at least one pair of identifications of the second active cell identification, the first active cell identification, the second five neighbor cell identifications and the first five neighbor cell identifications are found to be identical to each other, the location of the mobile communication terminal has not changed and is still located in an original call forwarding set area; and when neither pair of the pair of the second active cell identification and the first active cell identification, and pair of the second five neighbor cell identifications and the first five neighbor cell identifications, the location of the mobile communication terminal has changed and moved away from the original call forwarding set area.

7. A mobile communication terminal, comprising:

a call forwarding service setting and saving module, being configured to carry out setting of a call forwarding service and a call forwarding target phone number for the mobile communication terminal, and save a first base station information of a wireless network where the call forwarding service is set, wherein the first base station information comprises a first active cell identification, a first active cell signal strength and a first neighbor cell identification;

a call forwarding confirming module, being configured to read the call forwarding target phone number that is set, send a call forwarding request to the wireless network, and obtain a confirmation from the wireless network;

a checking timer module, being configured to detect a current location information of the mobile communication terminal;

a location comparing module, being configured to compare a second base station information of a current wireless network with the first base station information of the wireless network where the call forwarding service is set to determine a change in location of the mobile communication terminal, wherein the second base station information comprises a second active cell identification, a second active cell signal strength and a second neighbor cell identification; and a call forwarding canceling module, being configured to automatically cancel the setting of the call forwarding service when a change in location of the mobile communication terminal is determined.

8. The mobile communication terminal of claim 7, wherein the first base station information comprises the first active cell identification, the first active cell signal strength and first five neighbor cell identifications; and the second base station information comprises the second active cell identification, the second active cell signal strength and second five neighbor cell identifications.

* * * * *